(12) United States Patent
Hiscock

(10) Patent No.: US 9,900,673 B2
(45) Date of Patent: Feb. 20, 2018

(54) SOFTWARE DEFINED OPTICAL NETWORK

(71) Applicant: HEWLETT PACKARD ENTERPRISE DEVELOPMENT LP, Houston, TX (US)

(72) Inventor: James S. Hiscock, Rockport, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 20 days.

(21) Appl. No.: 15/022,984

(22) PCT Filed: Sep. 19, 2013

(86) PCT No.: PCT/US2013/060586
§ 371 (c)(1),
(2) Date: Mar. 18, 2016

(87) PCT Pub. No.: WO2015/041651
PCT Pub. Date: Mar. 26, 2015

(65) Prior Publication Data
US 2016/0241937 A1   Aug. 18, 2016

(51) Int. Cl.
*H04B 10/25* (2013.01)
*H04Q 11/00* (2006.01)
*H04J 14/02* (2006.01)

(52) U.S. Cl.
CPC ...... *H04Q 11/0066* (2013.01); *H04J 14/0256* (2013.01); *H04J 14/0282* (2013.01); *H04Q 11/0067* (2013.01); *H04Q 2011/0064* (2013.01)

(58) Field of Classification Search
CPC .............. H04J 14/0282; H04J 14/0267; H04Q 11/0066; H04Q 11/0005; H04Q 11/0067
USPC ............................................................ 398/58
See application file for complete search history.

(56) References Cited

U.S. PATENT DOCUMENTS

| 5,138,657 | A | 8/1992 | Colton et al. |
| 7,463,732 | B1 | 12/2008 | Hiscock et al. |
| 7,673,034 | B1 | 3/2010 | Hiscock et al. |
| 2007/0065078 | A1* | 3/2007 | Jiang ................ H04L 12/2861 385/76 |
| 2008/0267628 | A1 | 10/2008 | Li et al. |
| 2010/0098419 | A1 | 4/2010 | Levy et al. |
| 2012/0230693 | A1 | 9/2012 | Zou |
| 2013/0004172 | A1* | 1/2013 | Sugawa ................ H04J 3/1694 398/72 |
| 2013/0108263 | A1 | 5/2013 | Srinivas et al. |
| 2013/0121209 | A1 | 5/2013 | Padmanabhan et al. |
| 2013/0163426 | A1 | 6/2013 | Beliveau et al. |

(Continued)

OTHER PUBLICATIONS

"Dell Networking Delivers New SDN-enabled Fabric Solutions, Innovative Convergence Platform to Help Accelerate Data Center Transformation," Apr. 15, 2013, pp. 1-3, Dell.

(Continued)

*Primary Examiner* — Don N Vo
(74) *Attorney, Agent, or Firm* — Brooks, Cameron & Huebsch, PLLCC

(57) ABSTRACT

A network can include a logical core switch, a passive splitter optically connected to the logical core switch, and client access devices each optically connected to the passive splitter to form a homerun topology between the plurality of client access devices and the logical core switch. The network can be a software defined network (SDN) including a logical control plane.

14 Claims, 3 Drawing Sheets

(56) References Cited

U.S. PATENT DOCUMENTS

2013/0188946 A1    7/2013   Haramaty et al.
2013/0343755 A1*  12/2013   Cvijetic ............ H04Q 11/0066
                                                          398/45
2014/0363161 A1*  12/2014   Oikawa ............... H04J 14/0202
                                                          398/48

OTHER PUBLICATIONS

"Network Transformation with Software-defined Networking and Ethernet Fabrics," Aug. 2012, pp. 1-6, Positioning Paper, Brocade Communications Systems, Inc.

International Search Report and Written Opinion, International Application No. PCT/US2013/060586, dated Jun. 16, 2014, pp. 1-10.

Jim Duffy, "Juniper to Unveil Programmable Core Switch for Software-defined Networking," Mar. 22, 2013, pp. 1-3, Network World, Inc.

Joe Coffey, "Introduction to Wave Division Multiplexing," 2013, pp. 1-42, BICSI South West Regional Meeting, BICSI.

Neda Cvijetic et al., "Defining Optical Software-defined Networks (SDN): From a Compilation of Demos to Network Model Synthesis," Mar. 2013, pp. 1-3, OFC/NFOEC Technical Digest, Optical Society of America.

Steven Gringeri et al., "Extending Software Defined Network Principles to Include Optical Transport," Mar. 2013, pp. 32-40, IEEE Communications Magazine, IEEE.

* cited by examiner

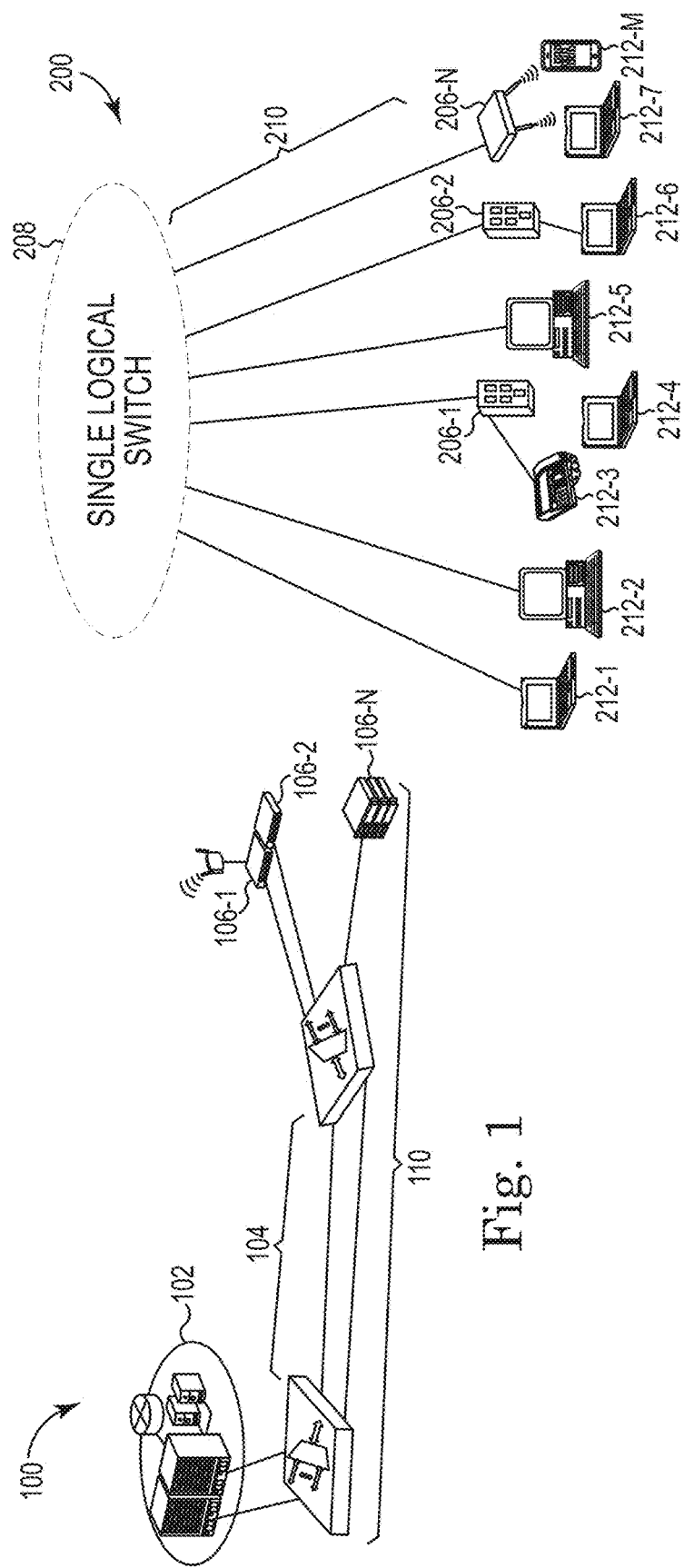

SOFTWARE DEFINED OPTICAL NETWORK

BACKGROUND

Before campus local area networks (LANs), some computers used point to point serial links (e.g., digital data communications message protocol (DDCMP)) to communicate and were directly connected. The campus LAN introduced in the early 1980s had computers connected to a common communication infrastructure (e.g., an Ethernet LAN). Some early implementations of Ethernet used a bus with fat coaxial cable and vampire taps to connect the computers. A collision based access method was used to send data on the bus. Ethernet repeaters were introduced to extend the reach of the communication bus. In the middle 1980s Ethernet bridges were introduced to connect and segment the traffic into zones, which could provide multiple simultaneous communications between different pairs of computers.

BRIEF DESCRIPTION OF THE DRAWINGS

FIG. 1 is a diagram illustrating an example of a network according to the present disclosure.

FIG. 2 is a diagram illustrating an example of a network according to the present disclosure.

DETAILED DESCRIPTION

Figure 3A:
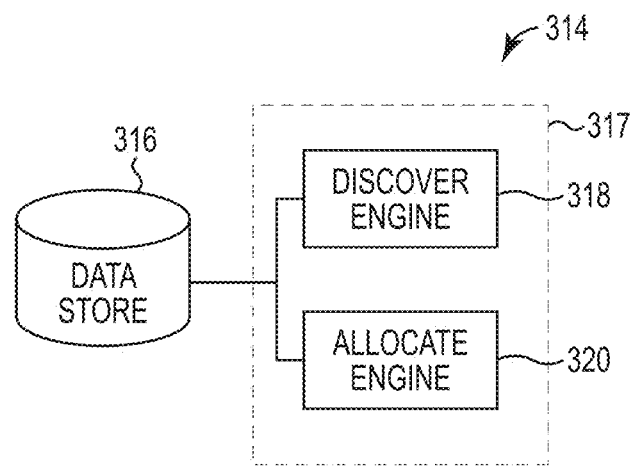
FIG. 3A is a diagram illustrating an example of a system according to the present disclosure.

Ethernet is a protocol that can carry different kinds of traffic including Internet Protocol (IP), Fiber Channel (FC), among others. Campus LAN implementations may include each computer connected with a cable (or wirelessly) to a device (e.g., a repeater or switch in a wiring closet). The wiring closet devices may be connected to various levels of aggregation devices such as switches, routers, hubs, etc. Thus, active switching devices may be implemented in the wiring closet and at the various levels of aggregation devices. However, these devices may add topological complexity, use significant effort to operate, cost significant amounts to operate, add management complexity, consume significant amounts of power, take up space, use cooling, add security vulnerabilities, add latency and jitter (variation in delay) as compared to some passive counterparts.

Accordingly, some examples of the present disclosure utilize passive splitters in an optical network having a homerun topology with a logical control plane (e.g., a single logical control plane) directly connecting client devices (e.g., desktop computers, laptop computers, desk phones, smartphones, etc.) and/or client access devices (e.g., a personal area network (PAN) switch, wireless access point (AP), optical-to-electrical converter, etc.). A client access device can be a device that a client device uses to connect to a network. A homerun topology can be a network topology in which each network node is connected to a core (e.g., a logical core switch) with a point-to-point connecting (e.g., from a client access device, through a passive optical splitter, to a logical core switch). Network traffic (e.g., all network traffic) can pass through the core. The cabling connecting the nodes to the core can be referred to as a "homerun" of cabling. Various examples of the present disclosure can provide more secure private links with lower latency and jitter due to elimination of store and forward delays. Some examples use less power, take up less space, and provide a beneficial platform for implementing a software defined network (SDN).

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. For example, reference numeral 110 may refer to element "10" in FIG. 1 and an analogous element may be identified by reference numeral 210 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a diagram illustrating an example of a network 100 according to the present disclosure. In some examples, the network 100 can be an optical SDN. The network 100 can include a logical core switch 102. The logical core switch 102 can be or can include an SDN controller that can include a processing resource in communication with a memory resource. The memory resource can include a set of instructions, executable by the processing resource to perform a number of functions described herein. In some examples, the logical core switch 102 can be a discrete device, such as a chassis based switch. In some examples, the logical core switch 102 can be a distribution of devices, for example, such as a set of stackable switches. The logical core switch 102 can be a plurality of physical switches.

A passive splitter 104 can be optically connected to the logical core switch 102 (e.g., to a physical switch included in the logical core switch 102). A plurality of client access devices 106-1, 106-2, . . . , 106-N (referred to generally as client access devices 106) can each be optically connected to the passive splitter 104 to form a homerun topology 110 between the client access devices 106 and the logical core switch 102. The passive splitter 104 can split an optical signal into a respective set of wavelengths (e.g., dedicated λ, channel, etc.) for each of the plurality of client access devices 106. The terms "set of wavelengths", "λ", and "channel" are generally used interchangeably herein. As described herein, the network 100 can be an SDN including a single logical control plane. The passive splitter 104 can have a relatively high bandwidth fiber connection to the logical core switch 102 that can add bandwidth by adding channels and take advantage of coarse WDM (CWDM), dense WDM (DWDM), ultra dense WDM (U-DWDM), and beyond. The network 100 can include a plurality of passive splitters 104 in the homerun topology 110 that start (proximal to the logical core switch 102) with relatively higher bandwidth trunks and progress to relatively lower bandwidth branches downstream (in a direction from the logical core switch 102 to the client access devices 106, or directly to client devices). In an instance where a respective set of wavelengths and/or channel is not available for a particular client access device 106 (or client device), an Ethernet passive optical network (EPON)-like multicast distribution with encrypted connections can preserve security of communication between the logical core switch 102 and client access device 106 (or client device).

An example of a passive splitter 104 is a wavelength multiplexor/demultiplexor that receives a plurality of optical signals (e.g., a plurality of channels and/or mono-color inputs), multiplexes them into a combined optical signal (e.g., multi-color), transmits the combined optical signal, and demultiplexes (splits) the combined optical signal to a plurality of optical signals (e.g., channels, mono-color outputs, etc.). Each of the inputs and/or outputs of the mux/demux can be referred to as a port. A number physical switches associated with the logical core switch 102 can have a corresponding number of ports to communicate via the ports of the passive optical splitter 104. Likewise, a number of client access devices 106 and/or client devices can have a number of ports to communicate via the ports of the passive optical splitter 104. Communication via one port is not limited to using one set of wavelengths.

An SDN is a form of network virtualization in which the control plane (system that makes decisions that affect network traffick) is separated from the data plane (system that moves the network traffic) and implemented as software. Network administrators can therefore have programmable centralized control of network traffic without requiring physical access to the network's hardware devices. A logical switch (e.g., the logical core switch 102) can implement a logical control plane. For example, the logical core switch 102 can be a single logical switch that can implement a single logical control plane. Implementing a control plane can include providing processing and memory resources to execute instructions comprising the software that implements the control plane. Having a homerun topology without an active distribution layer can allow a network administrator to spend more time programming a software defined switch to meet the needs of application traffic and less time planning topologies, preventing loops, managing traffic (e.g., congestion, flow control, etc.), upgrading firmware, and dealing with incompatibility issues. Such examples can provide a centralized approach where the hardware and processing power used to provide the single logical control plane resides at the logical core switch 102, which can allow the client access devices to be light weight and/or low power devices. In some examples, the single logical control plane can be implemented by at least a portion of the client access devices 106. In such examples, the logical core switch 102 can function as a high speed backplane for the network 100, while the client access devices on the edge of the network 100 can include the hardware and processing power used to provide the single logical control plane. In some examples, the single logical control plane can be implemented by the logical core switch 102 and the client access devices 106 collectively.

Examples of client access devices 106 can include PAN switches with wired and/or wireless client device connections (e.g., located in an office), wireless APs (e.g., attached to a ceiling or wall in an office area), and/or optical-to-electrical converters with media adapter multiplexor/demultiplexor devices, among others, to preserve horizontal distribution (e.g., via electrical connections) and/or to distribute power over Ethernet (PoE) (e.g., in a wiring closet). Such client access devices 106 can be part of the single logical switch (e.g., single logical switch 208 illustrated in FIG. 2) with an SDN implementation or via a port extender model.

In a specific example, some client access devices 106 and/or client devices may be allocated 100 megabits (Mb) of bandwidth due to limitations of their network adapters, while others may be allocated 1 gigabit (Gb). For example, 1 Gb, 10 Gb, 40 Gb, or 100 Gb can be allocated to a particular client access device 106 and/or client device (e.g., a single server network connection). Allocation can occur by configuration of the passive splitter 104 to associate a client access device 106 and/or client device with, for example, the logical core switch 102, a port, and/or a respective set of wavelengths. Allocation can be a priori (e.g., for passive splitters 104 that do not have a control input) and/or through the control plane (e.g., for passive splitters 104 that are controllable optical devices, which can allow for more flexible creation of homerun topologies). The control plane can allocate the bandwidth by controlling the passive optical splitters 104 such that the optical signals are directed to the appropriate client access devices 106 and/or client devices. If, for example, each respective set of wavelengths carries 1 Gb, each respective set of wavelengths could be reserved for one client device (if the client device uses 1 Gb) or ten (if the client devices only use 100 Mb). A respective client access device 106 could therefore use one respective set of wavelengths to serve one 1 Gb client device or ten 100 Mb client devices without having to use multicast and encryption. However, the client access device 106 could fall back to the multicast and encryption option if client bandwidth requirements increased.

Some examples of controllable optical devices include reconfigurable optical add-drop multiplexors (ROADM). As the name implies, a ROADM can add or drop (e.g., by operation of a filter) a number of sets of wavelengths from an optical signal. Sets of wavelengths can be added or dropped programmably. Such programmability can allow for geographical flexibility in creating point to point links without the complexity of a typical switch based distribution level, without the store and forward delay, and/or without end of line queue blocking traffic management complexity. Some examples of the present disclosure can include a ROADM as the passive splitter 104 and/or in conjunction with the passive splitter 104 to create the homerun topology 110 at a distribution layer.

Some examples of the present disclosure can combine SDN, passive optical LAN solutions (POLS), and client access devices 106. At a high level, this can reduce or eliminate active switching devices in a wiring closet and/or at various aggregation levels. Such active switching can be replaced with a number of passive optical splitters 104 that can provide connections (e.g., dedicated connections) from each client (e.g., client devices 206 illustrated in FIG. 2) to a logical core switch 102 and/or to a single logical switch (e.g., single logical switch 208 illustrated in FIG. 2). Passive devices can take up less space and consume less power. A homerun topology 110 can be easier to understand and configure than some previous approaches. Examples of previous topologies include spanning tree, multiple spanning trees creating multiple overlays using virtual LANS (VLANs), a transparent interconnection of lots of links (TRILL) mesh, among others. The homerun topology 110 can provide a lower probability of configuration error and/or reduced or eliminated firmware updates, which can reduce the cost of ownership. A homerun topology 110 can provide more security, reduced packet latency, fewer hops, reduced or eliminated path changes and resulting traffic disruptions, reduced updates to operational devices, and/or reduced configuration and interoperability issues, among others.

FIG. 2 is a diagram illustrating an example of a network 200 according to the present disclosure. The network 200 can be analogous to the network 100 illustrated in FIG. 1. FIG. 2 includes a representation of the single logical switch 208. The single logical control plane described herein can present the logical core switch 102 illustrated in FIG. 1, the passive splitter 104 illustrated in FIG. 1, and/or a number of client access devices 106 illustrated in FIG. 1 as the single logical switch 208 to a plurality of client devices 212-1, 212-2, 212-3, 212-4, 212-5, 212-6, 212-7, . . . , 212-M (generally referred to herein as client devices 212) connected to a number of client access devices 206-1, 206-2, . . . , 206-N (generally referred to herein as client access devices 206). The network 200 has a homerun topology 210 between the single logical switch 208 and client access devices 206 and/or client devices 212.

An example of a client access device 206 can be a wireless AP 206-N. The wireless AP 206-N can serve as a port extender from the single logical switch 208 (e.g., for connection to a number of client devices 212-7, 212-M having wireless capability). An example of a client access device 206 can be an optical-to-electrical converter (not specifically illustrated) to provide PoE to a client device 212. The optical-to-electrical converter can convert a communication channel from a fiber distribution system to Ethernet packets and/or serve as power sourcing equipment (PSE) for PoE to client access devices 206 and/or client devices 212. An example of a client access device 206 can be a PAN device 206-1 to provide a wired connection to a first client device 212-3 and a wireless connection to a second client device 212-4. Other examples of PAN devices (e.g., PAN device 206-2) may provide only one of a wired or wireless connection to client devices 212 (e.g., client device 212-6). One specific example of a PAN device is a flexible data outlet (e.g., IntelliJack). A flexible data outlet can include a housing configured for placement in an operating area of a user, such as on a wall adjacent to a user's work space. User interface circuitry in the housing can provide an interface (e.g., wired and/or wireless) to user equipment located in the user operating area, such as a telephone and computer. The housing can include premises interface circuitry to provide an interface for premises equipment located generally outside the user operating area (e.g., telephone communications equipment providing access to a public telephone network). Some examples of the housing can be packaged similarly to a housing used for a standard telephone or Ethernet wall jack. Some examples of the flexible data outlet can include a processing resource and/or logic to facilitate communication between the user equipment and a data infrastructure.

Some examples can employ an EPON and can use a broadcast mechanism that can be used with encryption. Some examples can employ a number of versions of wavelength division multiplexing (e.g., WDM, DWDM, U-DWDM, etc.) techniques and provide each client device with dedicated bandwidth in both directions with a respective λ (e.g., colors of light and/or a channel) per trunk distribution path or a dedicated fractional λ (e.g., 100 Mb client devices can be allocated 1/10 of a 1 Gb λ). Such connectivity can be more secure because it does not give off electromagnetic fields as with copper transmission. Fewer active devices in such a network store and forward packets, which provides less of an opening for security attacks or misdirecting packets away from a client device to a malicious entity elsewhere in the network (e.g., for snooping, denial of service attacks, etc.).

The improved homerun topology 210 can make deploying SDN easier and more effective than with standard switch LAN topologies. A single logical data plane function can be implemented as a set of switches acting as the single logical switch 208 coordinated by a single logical control plane (e.g., a centralized control plane). As client devices 212 are added and removed from the network, the topology does not need to change and provisioning can be straightforward. Bandwidth can be allocated by deploying sufficient sets of wavelengths in a vertical distribution to provide client device connections in the vertical distribution. Passive splitters can connect between vertical and horizontal distribution cabling. Because the homerun topology 210 can separate bandwidth used by the client devices 212 by allocating dedicated high bandwidth connections, there can be less interdependence of bandwidth allocated between client devices 212. SDN processing cycles can be focused on servicing applications that are using the network 200 rather than making topological calculations, overlays, congestion control, and other topology related engineering.

FIG. 3A is a diagram illustrating an example of a system 314 according to the present disclosure. The system 314 can include a data store 316, a subsystem 317, and/or a number of engines 318, 320. The subsystem can include the number of engines (e.g., discover engine 318 and/or allocate engine 320 and can be in communication with the data store 316 via a communication link. The system 314 can include additional or fewer engines than illustrated to perform the various functions described herein. The system can represent software and/or hardware of a network controller (e.g., network controller 321 as referenced in FIG. 3B, etc.).

The number of engines can include a combination of hardware and programming that is configured to perform a number of functions described herein (e.g., allocate bandwidth by division of an optical signal from the logical core switch into a respective set of wavelengths for each of the plurality of client access devices via the number of passive splitters, etc.). The programming can include program instructions (e.g., software, firmware, etc.) stored in a memory resource (e.g., computer readable medium, machine readable medium, etc.) as well as hard-wired program (e.g., logic).

Figure 3B:
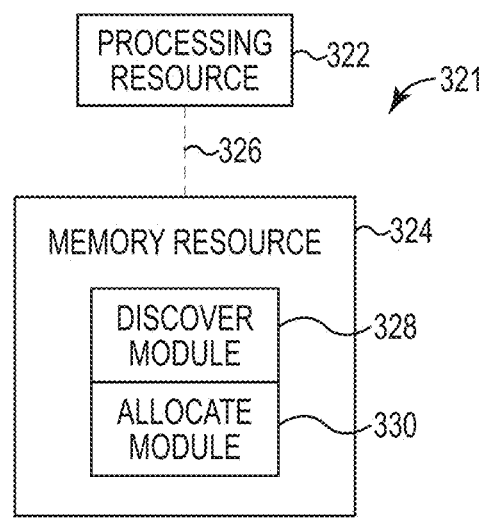
FIG. 3B is a diagram illustrating an example of a network controller according to the present disclosure.

Each of the number of engines 318, 320 can include hardware and/or a combination of hardware and programming that can function as a corresponding module as described with respect to FIG. 3B. For example, the discover engine 318 can include hardware and/or a combination of hardware and programming that can function as the discover module 328. In another example, the allocate engine 320 can include hardware and/or a combination of hardware and programming that can function as the allocate module 330.

FIG. 3B is a diagram illustrating an example of a network controller 321 according to the present disclosure. For example, the network controller 321 can be implemented in the logical core switch 102 and/or in the client access devices 106 illustrated in FIG. 1. The network controller 321 can utilize software, hardware, firmware, and/or logic to perform a number of functions.

The network controller 321 can be a combination of hardware and program instructions configured to perform a number of functions (e.g., actions). The hardware, for example, can include a number of processing resources 322 and a number of memory resources 324, such as a machine-readable medium (MRM) or other memory resources 324. The memory resources 324 can be internal and/or external to the network controller 321 (e.g., the network controller 321 can include internal memory resources and have access to external memory resources). The program instructions (e.g., machine-readable instructions (MRI)) can include instructions stored on the MRM to implement a particular function (e.g., an action such as allocating bandwidth of an optical signal). The set of MRI can be executable by one or more of the processing resources 322. The memory resources 324 can be coupled to the network controller 321 in a wired and/or wireless manner. For example, the memory resources 324 can be an internal memory, a portable memory, a portable disk, and/or a memory associated with another resource, e.g., enabling MRI to be transferred and/or executed across a network such as the Internet.

Memory resources 324 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 322 can be coupled to the memory resources 324 via a communication path 326. The communication path 326 can be local or remote to the network controller 321. Examples of a local communication path 326 can include an electronic bus internal to a machine, where the memory resources 324 are in communication with the processing resources 322 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 326 can be such that the memory resources 324 are remote from the processing resources 322, such as in a network connection between the memory resources 324 and the processing resources 322. That is, the communication path 326 can be a network connection. Examples of such a network connection can include LAN, wide area network (WAN), PAN, and the Internet, among others.

As shown in FIG. 3, the MRI stored in the memory resources 324 can be segmented into a number of modules 336, 338 that when executed by the processing resources 322 can perform a number of functions. As used herein a module includes a set of instructions included to perform a particular task or action. The number of modules 556, 558 can be sub-modules of other modules. For example, the discover module 328 can be a sub-module of the allocate module 330 and/or the discover module 328 and the allocate module 330 can be contained within a single module. Furthermore, the number of modules 328, 330 can comprise individual modules separate and distinct from one another. Examples are not limited to the specific modules 328, 330 illustrated in FIG. 3.

The network controller 321 can include a discover module 328, which can discover a plurality of optical connections in a homerun topology that includes a logical core switch (e.g., logical core switch 102 illustrated in FIG. 1), a number of passive splitters (e.g., passive splitter 104 illustrated in FIG. 1), and a plurality of client access devices (e.g., client access devices 106 illustrated in FIG. 1). For example, the network controller 321 can discover the plurality of optical connections through one of a discovery protocol and manual input. The network controller 321 can include an allocate module 330, which can allocate bandwidth by division of an optical signal from the logical core switch into a respective set of wavelengths for each of the plurality of client access devices via the number of passive splitters. In some examples, the network controller 321 can allocate the bandwidth according to capabilities of the plurality of client access devices and bandwidth requirements of a plurality of client devices connected to the plurality of client access devices. The network controller 321 can reallocate bandwidth such that a number (e.g., two) of the plurality of client access devices share a respective set of wavelengths by encrypted multicast distribution.

Figure 4:
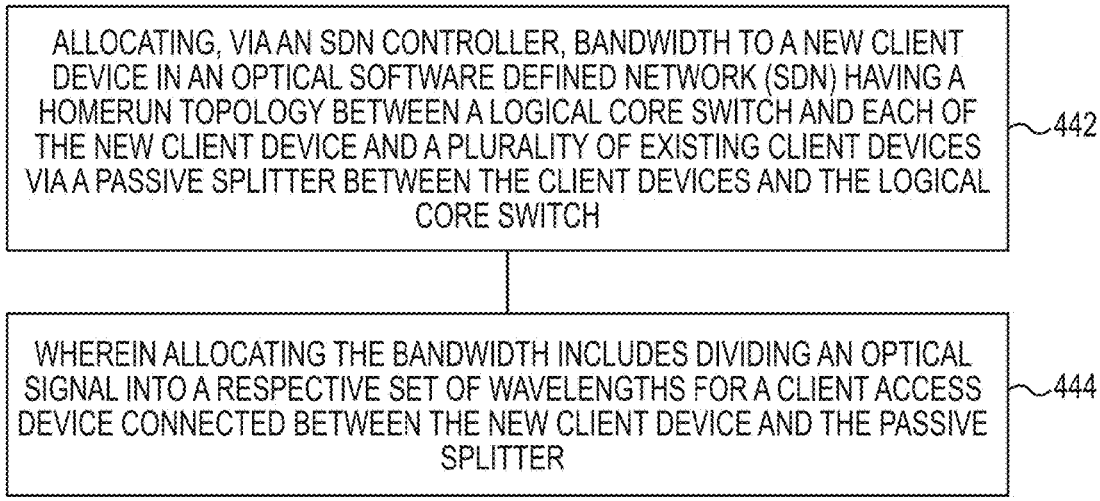
FIG. 4 is a flow chart illustrating an example of a method according to the present disclosure.

FIG. 4 is a flow chart illustrating an example of a method according to the present disclosure. At block 442, the method can include allocating, via an SDN controller, bandwidth to a new client device in an optical software defined network (SDN) having a homerun topology between a logical core switch and each of the new client device and a plurality of existing client devices via a passive splitter between the client devices and the logical core switch. At block 444, allocating the bandwidth can include dividing an optical signal into a respective set of wavelengths for a client access device connected between the new client device and the passive splitter. Allocating the bandwidth can further include wavelength division multiplexing the optical signal.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A network, comprising:
   a logical core switch;
   a passive splitter optically connected to the logical core switch; and
   a plurality of client access devices each optically connected to the passive splitter to form a homerun topology between the plurality of client access devices and the logical core switch;
   wherein the network comprises a software defined network (SDN) including a logical control plane to allocate bandwidth by causing the passive splitter to split an optical signal into a respective set of wavelengths for each of the plurality of client access devices.

2. The network of claim 1, wherein the logical core switch implements the logical control plane, which comprises a single logical control plane.

3. The network of claim 1, wherein at least a portion of the plurality of client access devices implement the single logical control plane.

4. The network of claim 1, wherein the plurality of client access devices and the logical core switch collectively implement the single logical control plane.

5. The network of claim 1, wherein the logical core switch comprises a plurality of physical switches.

6. The network of claim 1, wherein the single logical control plane presents the logical core switch, the passive splitter, and the plurality of client access devices as a single logical switch to a plurality of client devices connected to the plurality of client access devices.

7. The network of claim 6, wherein one of the plurality of client access devices comprises a wireless access point (AP), to serve as a port extender from the single logical switch.

8. The network of claim 1, wherein one of the plurality of client access devices comprises an optical-to-electrical converter to provide power over Ethernet (PoE) to a client device.

9. The network of claim 1, wherein one of the plurality of client access devices comprises a personal area network (PAN) device to provide a wired connection to a first client device and a wireless connection to a second client device.

10. A system, comprising:
  a discover engine to discover a plurality of optical connections in a homerun topology that includes a logical core switch, a number of passive splitters, and a plurality of client access devices; and
  an allocate engine to allocate bandwidth by division of an optical signal from the logical core switch into a respective set of wavelengths for each of the plurality of client access devices via the number of passive splitters.

11. The system of claim 10, including the allocate engine to allocate the bandwidth according to capabilities of the plurality of client access devices and bandwidth requirements of a plurality of client devices connected to the plurality of client access devices; and
  including the allocate engine to reallocate bandwidth such that two of the plurality of client access devices share a respective set of wavelengths by encrypted multicast distribution.

12. The system of claim 10, including the discover engine to discover the plurality of optical connections through one of a discovery protocol and manual input.

13. A method, comprising:
  allocating, via an SDN controller, bandwidth to a new client device in an optical software defined network (SDN) having a homerun topology between a logical core switch and each of the new client device and a plurality of existing client devices via a passive splitter between the client devices and the logical core switch;
  wherein allocating the bandwidth includes dividing an optical signal into a respective set of wavelengths for a client access device connected between the new client device and the passive splitter.

14. The method of claim 13, wherein allocating the bandwidth further includes wavelength division multiplexing the optical signal.

* * * * *